United States Patent [19]

Galbraith

[11] Patent Number: 5,191,313
[45] Date of Patent: Mar. 2, 1993

[54] METHOD OF CONTINUOUS MONITORING OF PROCESS VARIABLES OF VARYING GRADES OF A PRODUCT WITHIN A PROCESS CONTROL SYSTEM

[75] Inventor: Richard R. Galbraith, Maricopa, Ariz.

[73] Assignee: Honeywell Inc., Minneapolis, Minn.

[21] Appl. No.: 758,058

[22] Filed: Sep. 12, 1991

[51] Int. Cl.$^5$ .............................................. G08B 23/00
[52] U.S. Cl. .................................... 340/501; 340/500; 340/506; 364/130; 364/143
[58] Field of Search ............ 340/501, 500, 506, 870.01; 364/130, 138, 143

[56] References Cited

U.S. PATENT DOCUMENTS

| | | | |
|---|---|---|---|
| 3,665,399 | 5/1972 | Zehr et al. .......................... | 340/501 |
| 4,263,583 | 4/1981 | Wyckoff .............................. | 340/501 |
| 4,399,428 | 8/1983 | Hughes et al. ....................... | 340/501 |
| 4,885,573 | 12/1989 | Fry et al. ............................ | 340/500 |

Primary Examiner—Donnie L. Crosland
Attorney, Agent, or Firm—A. A. Sapelli; W. Udseth; A. Medved

[57] ABSTRACT

A process control system which is controlling a continuous process produces an output product having a first grade. The process control system performs quality checks at predetermined times on the output product for verifying predetermined parameters of the output product of the first grade are within predetermined limits. A method for dynamically monitoring the continuous process (without shutting down the process) when the grade of the output product is changed to a second grade having second predetermined limits, comprises the steps of initiating new setpoints for the continuous process to produce an output product having the second grade. The predetermined parameters of the output product is verified by the process control system to be within second predetermined limits of the second grade. When the predetermined parameters of the output product fall outside the second predetermined limits, an alarm is indicated, and the output product divert to a bypass path.

8 Claims, 3 Drawing Sheets

METHOD OF CONTINUOUS MONITORING OF PROCESS VARIABLES OF VARYING GRADES OF A PRODUCT WITHIN A PROCESS CONTROL SYSTEM

BACKGROUND OF THE INVENTION

The present invention relates to a process control system, and more particularly, to a method for dynamically varying the monitoring process when the grade of the product being produced by the process control system is changed without shutting down the process control system.

In current systems, the quality control scheme is disrupted every time a grade/brand change is made on a production line of a process being controlled by the process control system. The process is stopped, the system reinitialized and/or adjusted for the change in the grade/brand, and the system started again. This results in less precise statistical control during the start-up portion of each production run, when the process is likely to be least stable and require the most adjustment.

The method of the present invention makes the change in grade/brand without shutting down the system thereby providing the same level of statistical precision in monitoring the first sample in the production run of the newly selected grade/brand as is available for a well-established running continuous process.

SUMMARY OF THE INVENTION

Therefore there is provided by the present invention, a method of dynamically varying the monitoring process, when the grade of the product being produced by a process control system is changed, without shutting down the process control system. In a process control system which is controlling a continuous process, the continuous process produces an output product having a first grade. The process control system performs quality checks at predetermined times on the output product for verifying predetermined parameters of the output product of the first grade are within predetermined limits. A method for dynamically monitoring the continuous process when the grade of the output product is changed to a second grade having second predetermined limits, comprises the steps of initiating new setpoints for the continuous process such that the output product having the second grade is produced. The process control system remembers that the second grade is being produced and that a transition period is beginning. The predetermined parameters of the output product is verified by the process control system to be within second predetermined limits of the second grade. When the predetermined parameters of the output product fall outside the second predetermined limits, an alarm is indicated.

The change from the first grade to the second grade is made without stopping the process. If the process control system determines that the predetermined parameters of the output product fall outside the predetermined limits, the output product is diverted to a bypass path thereby avoiding contamination of the stored output product. Further if the process is in the transition period a first alarm is indicated by the process control system; otherwise a second alarm is indicated.

Accordingly, it is an object of the present invention to provide a method to permit continuous monitoring of a process when the grade of the product being produced by the process control system is varied.

It is another object of the present invention to provide a method to dynamically vary the monitoring process, when the grade of the product being produced by the process control system is changed, without shutting down the process control system.

These and other objects of the present invention will become more apparent when taken in conjunction with the following description and attached drawings, wherein like characters indicate like parts, and which drawings form a part of the present application.

DETAILED DESCRIPTION

Figure 1:
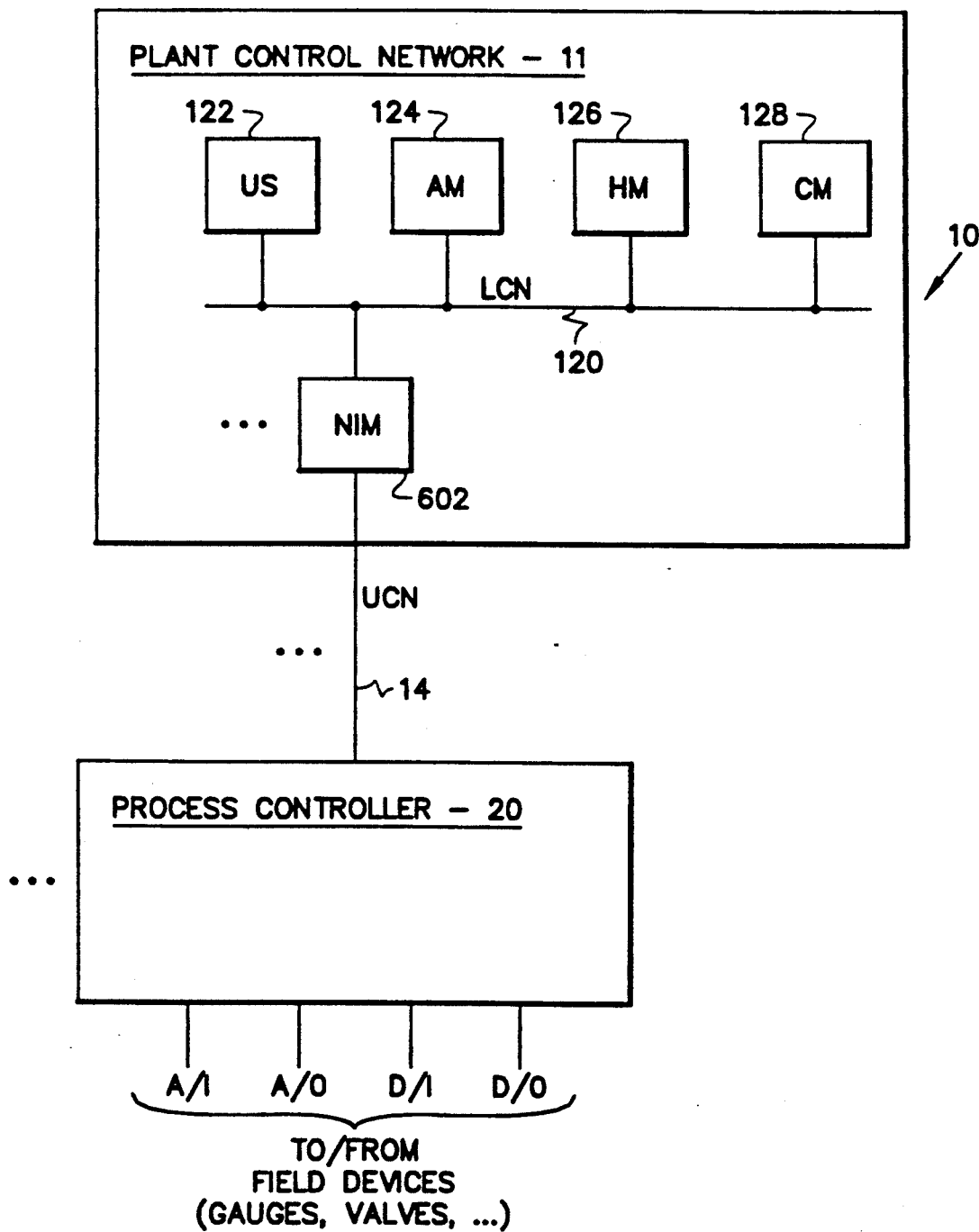
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the method of the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station module (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14.

Universal operator station module 122 of plant control network 11 is the work station for one or more plant operators. It includes an operator console which is the interface between the plant operator, or operator, and the process or processes of the plant for which they are responsible. Each universal operator station module, 122, and any backup modules (not shown) for example, is connected to LCN 120, and all communications between the universal operator station module, 122, and any other module 124, 126, 602 . . . of the plant control network 11, including any backup modules (not shown) is by means of LCN 120. Universal operator station module 122 has access to data that is on LCN 120 and the resources and data available through, or from, any of the other modules of plant control network 11. Each universal station module 122 includes a cathode ray tube display, designated CRT, which includes a video display generator, an operator keyboard, a floppy disc data storage device, trend pen recorders, and status displays, for example (not shown).

Another type of physical module included in plant control network 11 is history module 126 which provides mass data storage capability. Each history module 126 includes at least one conventional disc mass-storage device such as a Winchester disc, which disc storage device provides a large-volume of nonvolatile, nonremovable storage capability for binary data. The types of data stored by such a mass-storage device are typically trend histories, or data from which such trends can be determined, data that constitutes, or forms, CRT-type displays, copies of programs for the units of the process controller 20 for modules 122, 124, . . . or for units of the modules of plant control network 11.

Another type of module incorporated into the plant control network 11 is an application module 124. Application module 124 provides additional data-processing capability in support of the process control functions performed by the process controllers 20, such as data acquisition, alarming, batch history collection, and providing continuous control computational facilities when needed. The data processing capability of application module 124 is provided by its module processor and module memory (not shown). Computer module 128 uses the standard or common units of all physical modules to permit a medium-to-large scale, general-purpose data-processing system to communicate with other modules 122, 124, . . . of plant control network 11 and the units of such modules over LCN 120 and the units of process controller 20 via NIM 602. Data processing systems of a computer module 128 are used to provide supervisory, optimization, generalized user program preparation and execution of such programs in higher-level program languages. Typically, the data-processing systems of the computer module 128 have the capability of communicating with other such systems by a communication processor and communication lines, as is well know in the art.

LCN 120 of the preferred embodiment is a high-speed, bit serial dual redundant communication bus that interconnects all the modules 122, 124, . . . of plant control network 11. Bus 11 provides the only data transfer path between the principal sources of data such as NIM 602, application module 124, and history module 126, and principal users of such data, such as universal operator station module 122, computer module 128, and application module 124. Bus 11 also provides the communication medium over which large blocks of data, such as memory images, can be moved from one module such as history module 126 to universal station module 122.

Each of the physical modules 122, . . . of the plant control network 11 of the system of the preferred embodiment includes certain, or required, standard units. A more complete description of the plant control network 11, and the physical modules can be had by reference to U.S. Pat. No. 4,607,256.

The process controller 20 of the preferred embodiment of the process control system 10 includes a controller A (not shown) and at least one input/output processor (IOPs) sometimes referred to herein as input output (I/O) modules (not shown) which interface to field devices, field devices being various valves, pressure switches, pressure gauges, thermocouples, . . . which can be analog inputs (A/I), analog outputs (A/O), digital inputs (D/I), and digital outputs (D/O). On a predetermined time basis, point processing is performed by controller A (not shown) and communicates with the I/O modules 21. In addition, the controller A (not shown) of process controller 20 communicates with the plant control network 11 reporting status, history, and accepting inputs from the plant control network such as commands from the operator via the universal station 122.

Figure 2:
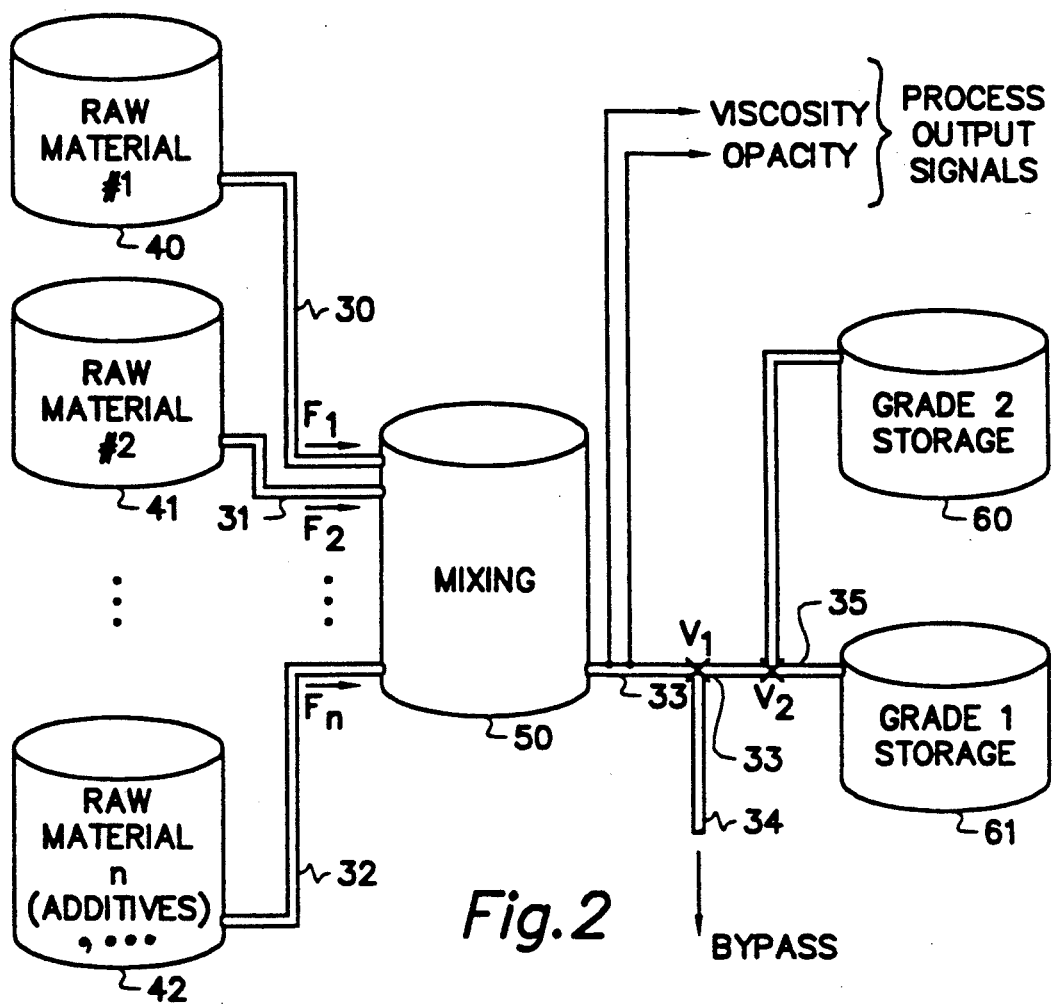
FIG. 2 shows a functional block diagram of a generic process being controlled by the process control system.

The method of the present invention will now be described utilizing an example of a generic continuous process being controlled by the process control system 10. Referring to FIG. 2, there is shown a functional block diagram of the generic process. The generic process can be for the production of various grades of oil (e.g., 20 weight, 30 W . . . ) food stuff items (to obtain various blends of grains, . . . ) detergents, toiletries, and a wide variety of products. The manufacture of various grades (weights) of paper and other products which are not directly related of the process of FIG. 2 but require different processes can still utilize the concept of the present invention as will be readily recognized by those skilled in the art; namely, that of real time monitoring during a change of grade without shutting down the continuous process thereby deriving the inherent benefits.

The generic process (or as referred to as herein as simply process) includes a vat 40 containing a first raw material, a second vat 41 containing a second raw material, and additional vats 42 for storing additional raw materials needed for generating the product. The first vat has an output pipe (or pipeline) 30 for delivering the first raw material to a mixing vat 50. Similarly, the second vat 41 includes a pipe 31 for delivering the second raw material to the mixing vat 50, and likewise, the additional vats 42 each include a pipe 32 for delivering the respective raw materials stored therein to the mixing vat 50.

Let's assume, for purposes of example only, that a 20 weight (20 W) oil is being produced by the process of FIG. 2. The raw material in the first vat 40 includes a first oil type, the raw material in the second vat 41 includes a second oil type and the additional vats include the additional raw materials, including a vat 42 which includes the additives to the final product. The operator of the process control system 10 inputs the desired information at the universal station 122 that 20 weight oil is now to be produced. That information is down-loaded to the process controller 20 along with any other additional control information required by the process controller to control the process. From the information supplied to the process controller 20, the process controller 20 controls the flow rates from each vat. Thus, the process controller 20 maintains the flow rate in pipe 30 from vat 40, a flow rate, $F_1$, which is between $m_1$ and $n_1$. The flow rate from the second vat 41 is maintained such that $F_2$ is between $m_2$ and $n_2$, . . . and the flow rate from vat$_n$ 42 has a flow rate in the pipeline 32 of $F_n$ between $m_n$ and $n_n$. These flow rates are determined from a recipe which is information down-loaded from the process control network 11 for the generation of the desired product. These flow rates are maintained by controlling output valves (not shown) from the respective tank by the process controller which interfaces with the various field devices, as described above. Various parameters such as temperature of the raw materials, and temperature of the mixing vat are monitored by the process controller, since the volume of raw materials entering the mixing vat 50 can vary as a function of temperature thereby requiring adjustments in the flow rate. This is all within the control algorithms exercised by the process controller 20 in order to insure the proper amount of raw materials enter the mixing vat 50 in accordance with the recipe (information) for generating the desired product (i.e., 20 W oil).

The mixing vat 50 includes an output pipe 33 which contains the produced product. At the output pipe 33 various process output signals are generated via measuring devices (not shown), and include viscosity, opacity, ... These signals are transmitted to the process controller 20 and are utilized by the process controller 20 and/or by the application module 124. If the viscosity and opacity are within the limits for the grade being produced, the valves V1 and V2 are positioned by the process controller 20 (as a result of point processing or as commanded by the application module 124) such that the product is delivered to storage tank 61, i.e., the grade 1 storage tank.

Figure 3:
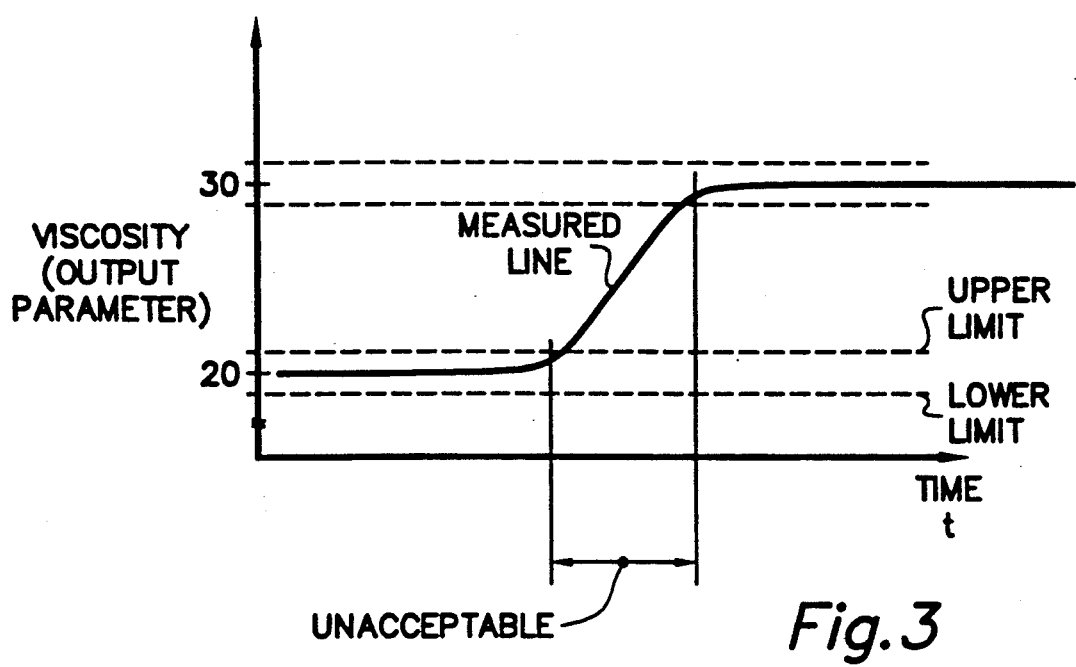
FIG. 3 shows a graph of a parameter value of a generated product as a function of time during a change in grade.

As some point in time it is desired to generate 30 weight oil. The operator at the universal station 122 will enter the information into the system, and the information down-loaded to the process controller 20. The process controller 20, in accordance with the information received, changes to setting of the output valves (not shown) varying the flow rates $F_1$ through $F_n$ (or setpoints) such that the product generated and outputted from the mixing vat 50 will be 30 weight oil. There will be a time during the transition in which the oil is neither 20 weight nor 30 weight. Referring to FIG. 3 there is shown a time line of the change in viscosity of the outputted product. When the viscosity of the outputted product is above an upper limit the product is unacceptable. Commands are generated such that valve 1 is open and the outputted product is diverted pipeline 34 to a bypass tank (the bypass can be a rework storage tank or other utilization made of the bypassed product). An alarm is raised by the controller measuring the values of the process output signals such that the operator is aware of what is going on with the process. Since the controller is aware that a change in grade has been initiated and also has stored information which includes the time that the measured value is unacceptable, a temporary alarm is generated. If the output product remains unacceptable for a longer period of time then specified, a different alarm is generated. Once the measured value of the outputted product is acceptable the controller generates the control signal such that valve 1 is positioned to allow the outputted product to continue in the outputted pipe line 33 and valve V2 is positioned such that the out putted product is delivered to the grade 2 storage tank 60 via pipeline 36.

Figure 4:
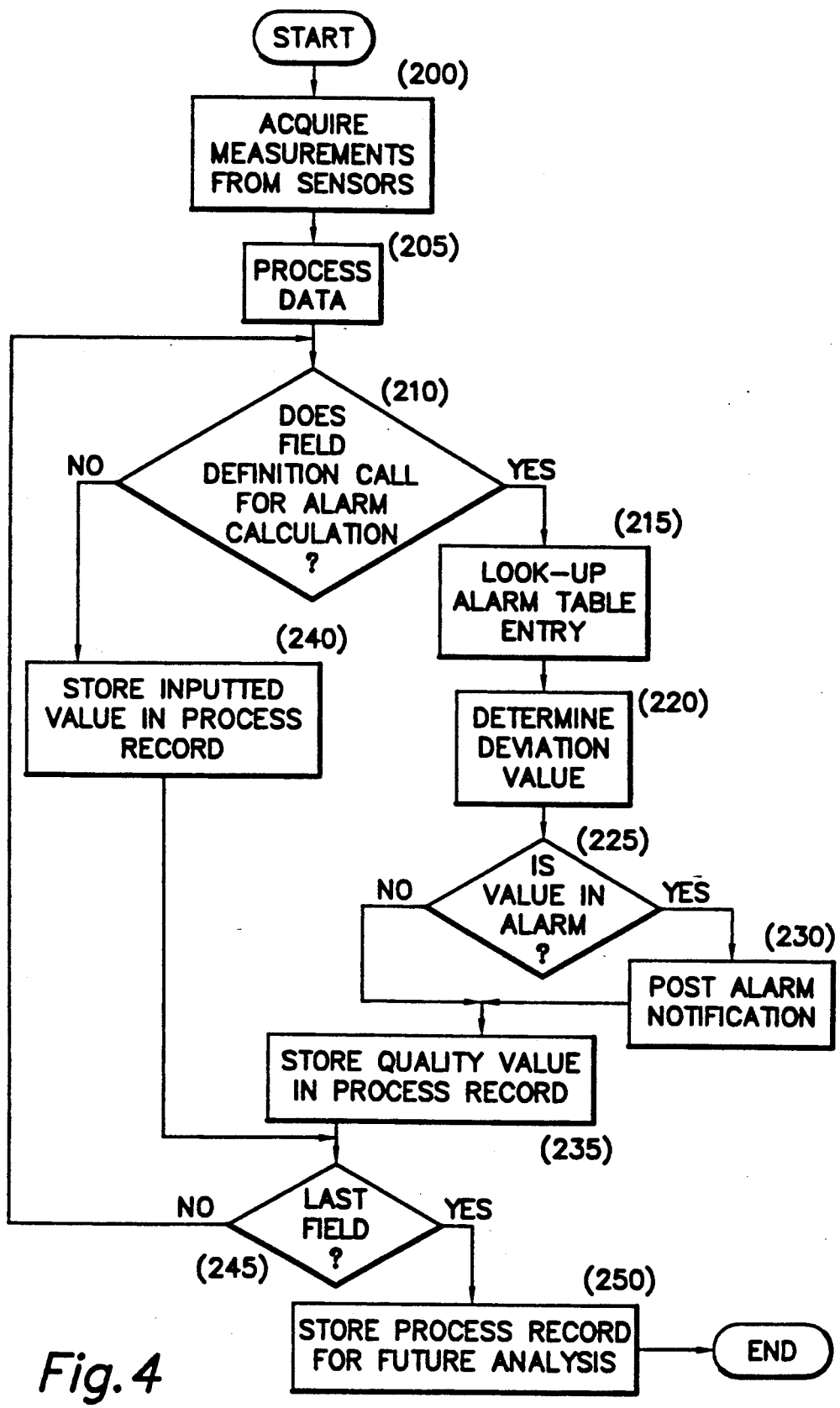
FIG. 4 shows a flow diagram of the verification of the process output signals.

Referring to FIG. 4 there is shown a flow diagram of the verification process of the process output signals. The process for verifying that the output product is within the limits, can be performed by either the process controller 20 or the application module 124, as discussed above. Periodically the values of the process output signal are gathered from the sensors in the manufacturing process (block 200). In the preferred embodiment of the present invention, the data inputted is formatted (with a time stamp) to form a process 13 record. The process record includes at least one recipe variable (i.e., the 20 weight oil is being generated) and at least one monitored variable (i.e., a process output signal, in this case viscosity). The data inputted is further processed (block 205), the processing including the placing the values (desired and limit values) into the process record based on information about the value in the process record that identifies the source of the measurement and/or the calculation utilized to obtained the value, if applicable. These field definitions are available to the controller performing the alarms check. If the definition of the current field being processed calls for an alarm calculation (block 210), the value of the recipe variable is utilized to look up the matching entry in an alarm table (block 215). In the preferred embodiment of the present invention the alarm tables are maintained as index filed on a disk with one record for each discrete value of the recipe variable, and the recipe variable is used as a key index read to obtain the desired entry into the process control storage. The inputted value is compared to the desired value of the parameter stored in the alarm table to determine the deviation of the inputted (or measured) variable (block 220). This deviation value may be stored in the data record and/or used by Statistical Quality Control routines to maintain consistent control charts of the process performance over a period of time that includes several changes in the target values. This provides for consistent quality control analysis of the process irrespective of grade changes. In the preferred embodiment of the present invention, based on specific alarm options indicated in the table, the deviation is utilized to determine if the value is an alarm condition. If an alarm condition is detected (block 225), an alarm notice is posted according to the information contained in the field definition, i.e., a temporary alarm or a serious alarm as discussed above. Alternative forms of alarm posting includes sending a message to a designated point in the process control signal or generating a process alarm on a predetermined note within the distributed control system (block 230). Once again based on the information contained in the tables, a selection is made as to what value is to be stored in the process record. In addition to the inputted variable, the desired value can be included, the limit value can be included, the calculated deviation from the target can be included, and the specific limit that was violated in the process record, (block 235), can be included in the process record.

Back at block 210, if no alarm determination was indicated, the desired value is formatted and stored in the process record (block 240). The loop starting at block 210 is repeated until all the inputted data for the process record has been processed. When all the information inputted has been processed (block 245), the process record is stored in the process control system, in the preferred embodiment in the history module 126, for future reporting and analysis (block 250).

It will be recognized by those skilled in the art that various techniques can be utilized to index into a table for obtaining desired information and storing historical data into predetermined fields of a predefined record of a file.

While there has been shown what is considered a preferred embodiment of the present invention, it will be manifest that many changes and modification can be made therein without departing from the essential spirit and scope of the invention. It is intended, therefore, in the annexed claims, to cover all such changes and modifications which fall within the true scope of the invention.

I claim:

1. In a process control system which is controlling a continuous process, the continuous process producing an output product having a first grade, the process control system performing quality checks at predetermined times on the output product for verifying that predetermined parameters of the output product having the first grade are each within first predetermined limits, a method for dynamically monitoring the continuous process to include a change in the output product from having a first grade to having a second grade, the predetermined parameters having second predetermined limits, the method comprising the steps of:
   a) initiating new setpoints for the continuous process such that the output product having the second grade is produced;
   b) determining that a transition period is beginning;
   c) during the transition period, after determining that the predetermined parameters of the output product fall outside the first predetermined limits,
      i) generating at least one temporary alarm, and
      ii) diverting the output product to a bypass path thereby avoiding contamination of the output product having the first grade stored in first predetermined storage area;
   d) upon determining that the transition period is completed,
      i) clearing the temporary alarm(s), and
      ii) causing the output product having the second grade to be stored in a second predetermined storage area;
   e) verifying that the predetermined parameters of the output product are each within the second predetermined limits of the second grade; and
   f) when the predetermined parameters of the output product fall outside the second predetermined limits, indicating an alarm.

2. A method for dynamically monitoring the continuous process according to claim 1, further comprising the step of: performing predetermined calculations of the predetermined parameter values throughout the producing of the output product having both the first and second grade thereby providing consistent quality control analysis of the continuous process irrespective of grade changes.

3. A method for dynamically monitoring the continuous process according to claim 2, wherein said process control system has readily available all information relating to all grades of the output product without requiring any loading or initialization of said process control system.

4. A method for dynamically monitoring the continuous process according to claim 3, wherein the information relating to all grades of the output product includes setpoint values for each grade, predetermined parameter values of each grade, and predetermined limits of each grade, the information being organized such that it is readily available by pointers and index value according to a selected grade.

5. In a process control system which is controlling a continuous process, the continuous process producing an output product having a first grade, a method for dynamically monitoring the continuous process to include a change in the output product from having a first grade to having a second grade, the method comprising the steps of:
   a) initiating first setpoints for the continuous process such that the output product having the first grade is to be produced;
   b) verifying that predetermined parameters of the output product having the first grade are each within first predetermined limits;
   c) upon desiring the output product to have the second grade, the predetermined parameters of the second grade of output product having second predetermined limits,
   initiating new setpoints for the continuous process such that the output product having the second grade is to be produced;
   d) determining that a transition period is beginning;
   e) during the transition period, after determining that the predetermined parameters of the output product fall outside the first predetermined limits,
      i) generating at least one temporary alarm, and
      ii) diverting the output product to a bypass path thereby avoiding contamination of the output product having the first grade stored in first predetermined storage area;
   f) upon determining that the transition period is completed,
      i) clearing the temporary alarm(s), and
      ii) causing the output product having the second grade to be stored in a second predetermined storage area;
   g) verifying that the predetermined parameters of the output product are each within the second predetermined limits of the second grade; and
   h) when the predetermined parameters of the output product fall outside the second predetermined limits, indicating an alarm.

6. A method for dynamically monitoring the continuous process according to claim 5, further comprising the step of: performing predetermined calculations of the predetermined parameter values throughout the producing of the output product having both the first and second grade thereby providing consistent quality control analysis of the continuous process irrespective of grade changes.

7. A method for dynamically monitoring the continuous process according to claim 6, wherein said process control system has readily available all information relating to all grades of the output product without requiring any loading or initialization of said process control system.

8. A method for dynamically monitoring the continuous process according to claim 7, wherein the information relating to all grades of the output product includes setpoint values for each grade, predetermined parameter values of each grade, and predetermined limits of each grade, the information being organized such that it is readily available by pointers and index value according to a selected grade.

* * * * *